M. B. SETTER.
PISTON RING.
APPLICATION FILED AUG. 30, 1918.
1,384,158.
Patented July 12, 1921.
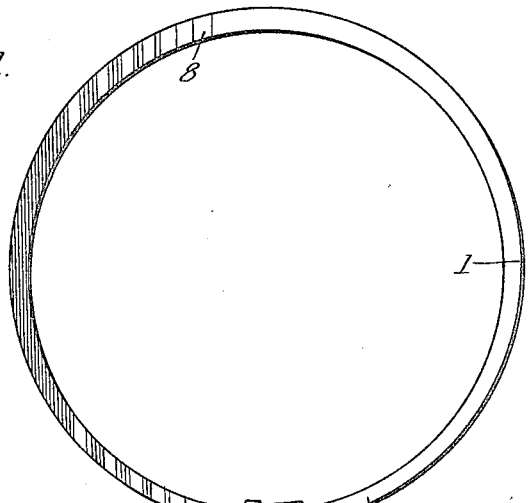
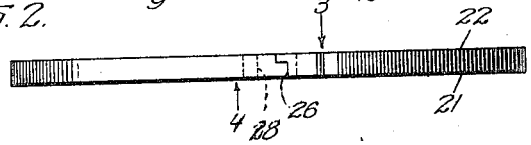
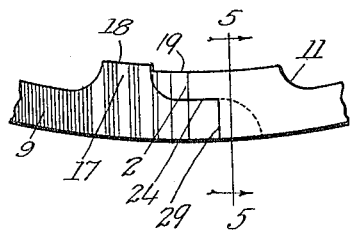
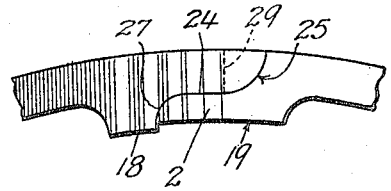
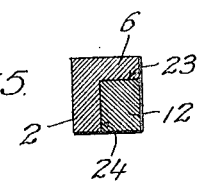
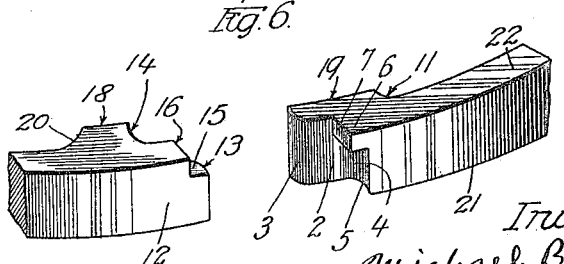
Witnesses:
Robert H. Weir
Arthur W. Carlson
Inventor
Michael B. Setter
By Arthur F. Durand Atty.

UNITED STATES PATENT OFFICE.

MICHAEL B. SETTER, OF CHICAGO, ILLINOIS.

PISTON-RING.

1,384,158.  Specification of Letters Patent.  Patented July 12, 1921.

Application filed August 30, 1918. Serial No. 252,036.

*To all whom it may concern:*

Be it known that I, MICHAEL B. SETTER, a citizen of the United States of America, and a resident of Chicago, Illinois, have invented a certain new and useful Improvement in Piston-Rings, of which the following is a specification.

This invention relates to split rings for use on pistons, or for other purposes, but more particularly to those which have a lap joint where the two end portions of the ring engage each other.

Generally stated, the object of the invention is to provide a novel and improved formation of the lap joint in the ring, with a view to preventing leakage and making the construction of the ring stronger, so that breakage will be less liable to occur, and whereby rings of this kind may be manufactured at a comparatively small cost of production.

It is also an object to provide certain details and features of construction tending to increase the general efficiency and serviceability of a piston ring of this particular character.

To these and other useful ends the invention consists in matters hereinafter set forth and claimed.

In the accompanying drawings—

Figure 1 is a plan of a piston ring involving the principles of the invention.

Fig. 2 is a side elevation or edge view of said ring.

Fig. 3 is an enlarged plan of the lap joint shown in Fig. 1.

Fig. 4 is a similar view showing the bottom or under side of the structure shown in Fig. 3.

Fig. 5 is a section on line 5—5 in Fig. 3.

Fig. 6 is a perspective of the two engaging end portions of the ring.

As thus illustrated, the invention comprises a ring 1 which is split at one side to provide two engaging end portions. One end portion is provided with an inner wall 2 which is rounded at its end 3, and which is rounded at 4 where it meets the shoulder or vertical edge corner 5, which latter is disposed a suitable distance from the rounded end portion 3 of the ring. A top wall 6 overhangs the rounded surface 4 and the shoulder or corner 5, and it will be seen that the ledge or overhanging portion formed by this top wall 6 is of less thickness or height than the shoulder 5, the latter occupying about two-thirds of the thickness of the ring, while the wall or overhang 6 is equal to about one-third of the thickness or height of the ring. Also, this top wall 6 is only about half as long as the wall 2, so that a straight shoulder 7 is formed about midway between the ends of the wall 2, whereby the latter extends some distance beyond said top wall. Preferably, the ring is what is ordinarily called an eccentric ring, being thicker at its side 8 than it is at the points 9 and 10 at opposite sides of the lap joint, so that the wall 2 terminates in a rounded shoulder 11 at the inner side of the ring, and in effect the wall 2 is offset inwardly relatively to the inner circumference of the ring.

The other end portion of the ring has an outer wall 12 which has its end rounded at 13 to fit the rounded surface 4 of the other end portion, and which is rounded at 14 to fit the rounded end 3 of said other end portion of the ring, whereby a lap joint is formed between the walls 2 and 12, this lap joint being practically flat and disposed in a vertical plane, when the engine is disposed vertically, and said lap joint being rounded at its opposite ends, so that a rounded shoulder or butt joint is formed at each end of said lap joint. In addition, it will be seen that a portion of the upper edge of the wall 12 is cut away to form a horizontal top surface 15 which engages the bottom of the top wall 6, thereby to provide a lap joint in a horizontal plane, and to provide a vertical shoulder 16 for engagement with the shoulder 7 previously described, and in this way a butt joint is formed between the shoulders 7 and 16, with square corners. The plane of the lap joint formed between the under side of the top wall 6 and the upper surface 15 is horizontal, preferably, and the ring itself is disposed in this plane, so that the two lap joints are in planes at right angles to each other, and one lap joint is only about half as long as the other. The wall 12 is preferably thicker than the wall 2, and the formation of the rounded shoulder 14 makes the ring thicker at 17 than it is at 9, and this thickened portion or inner projection 17 has its inner surface 18 disposed a little inside of the inner surface 19 of the wall 2, so that when the ring is in use the surface 18 will bear against the bottom of the seat in the piston, while there will be a slight space between the surface 19 and the said bottom surface of the seat or groove of the piston, whereby the end portion of the ring which has the wall 2 can spring inward a little when the ring is in use. At its other side the portion 17 is preferably rounded at 20, in the manner shown in the drawings.

The construction and formation of the ring not only facilitates the manufacture thereof, but also makes the ring stronger and less liable to break under the strain of explosions in the internal combustion engine, or under the strain of the pressure in any engine or motor or pump, or other structure in which it may be employed, although the ring is more particularly adapted for use in an internal combustion engine. The curve 4 eliminates a sharp corner between the wall 2 and the shoulder 5, and not only facilitates the manufacture of the ring, but also serves to prevent the possibility of fracture at this point. It will be understood that a fracture usually occurs where a sharp cornered recess is formed, the corner being the starting point of the fracture; but with the provision of the curved surface 4, such fracture is not liable to occur. This is also true, in the same way, of the curve at 14, as no fracture is liable to start or occur at this point, and for similar reasons the curves at 11 and 20 tend to preclude a fracture at these points. The location of the butt joint formed between the shoulders 7 and 16 tends to prevent leakage, and the relative arrangement of all of the lap joints and butt joints is such as to insure against leakage.

The ring can be used upside down, of course, or in such a position that its lower side 21 will be toward the pressure in the cylinder of the engine, or may be applied so that its upper side 22 will be toward the explosion chamber of the cylinder. Ordinarily, automobile engines are arranged vertically, and in such case the lap joint at 23, formed between the bottom of the wall 6 and the top surface 15, will be horizontal, while the lap joint 24, formed between the flat or substantially flat meeting surfaces of the walls 2 and 12, will be disposed substantially in a vertical plane.

Thus the rounded shoulders 5 and 13 provide a butt joint 25 which forms a straight line 26 extending transversely of the outer circumference of the ring, while the butt joint 27 between the surfaces 3 and 14 forms a straight line 28 extending transversely of the inner circumference of the ring. The butt joint 29 formed by the surfaces 7 and 16 extends transversely at a point between the butt joint 25 and the butt joint 27, the latter being rounded within the ring, while the butt joint 29 is straight and square cornered all around. The outer wall 12 of the lap joint 24 is, of course, flush with the outer circumference or periphery of the ring, but the inner wall 2 is not flush with the inner circumference of the ring, and is not flush with the thickened portion 17, so that the latter, as previously explained, serves to space the inner surface 19 of the wall 2 a distance from the bottom of the groove in the piston. In practice this tends to prevent breakage of the inner wall 2, as the pressure of the explosions is not exerted against the joint in a way which would be liable to cause such breakage, or breakage of the other portions, and consequently the construction tends to preclude trouble of this character.

What I claim as my invention is:—

1. The combination, in a piston ring of inner and outer end portions which are curved at their respective ends (3 and 13) and which are shaped to overlap one upon the other, so that two lap joints are formed in planes at an angle to each other, with one lap joint substantially longer than the other, the shorter lap joint being disposed in a plane between the two flat sides of the ring and terminating in a butt joint between the two curved ends (3 and 13), and an inwardly projecting portion (18) which is rigid with said outer end portion and which projects inwardly beyond the inner surface of said outer end portion.

2. A one-piece piston ring formed with eccentric inner and outer edges, with a lap joint in the relatively thin side of the ring, which joint is formed by inner and outer end portions, and said outer end portion having means projecting inwardly beyond the inner surface of the said inner end portion.

3. A structure as specified in claim 2, said inwardly projecting means comprising a lug (18) which is rounded at one side to engage said inner end portion.

MICHAEL B. SETTER.